United States Patent
Johansson et al.

(10) Patent No.: US 9,714,704 B2
(45) Date of Patent: Jul. 25, 2017

(54) TRANSMISSION CONTROL SYSTEM

(71) Applicant: SCANIA CV AB, Södertälje (SE)

(72) Inventors: Oskar Johansson, Stockholm (SE);
Mikael Ögren, Södertälje (SE);
Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 317 days.

(21) Appl. No.: 14/410,224

(22) PCT Filed: Jun. 26, 2013

(86) PCT No.: PCT/SE2013/050768
§ 371 (c)(1),
(2) Date: Dec. 22, 2014

(87) PCT Pub. No.: WO2014/003652
PCT Pub. Date: Jan. 3, 2014

(65) Prior Publication Data
US 2015/0362065 A1 Dec. 17, 2015

(30) Foreign Application Priority Data
Jun. 27, 2012 (SE) ...................... 1200389

(51) Int. Cl.
*F16H 61/02* (2006.01)
*B60W 30/18* (2012.01)
(Continued)

(52) U.S. Cl.
CPC ... *F16H 61/0213* (2013.01); *B60W 30/18072* (2013.01); *B60W 50/0097* (2013.01);
(Continued)

(58) Field of Classification Search
None
See application file for complete search history.

(56) References Cited

U.S. PATENT DOCUMENTS

| | | | | |
|---|---|---|---|---|
| 5,765,117 A | * | 6/1998 | Horiguchi | ........... F16H 61/0213 477/120 |
| 2012/0220424 A1 | * | 8/2012 | Staudinger | ............ B60W 30/16 477/80 |
| 2013/0261931 A1 | * | 10/2013 | Hamane | .................. F02D 29/02 701/102 |

FOREIGN PATENT DOCUMENTS

| | | |
|---|---|---|
| DE | 10 2008 023135 A1 | 11/2009 |
| DE | 10 2011 109039 A1 | 1/2012 |
| WO | WO 2011/075065 A1 | 6/2011 |

OTHER PUBLICATIONS

International Search Report dated Oct. 31, 2013 issued in corresponding International patent application No. PCT/SE2013/050768.

* cited by examiner

*Primary Examiner* — Edwin A Young
(74) *Attorney, Agent, or Firm* — Ostrolenk Faber LLP

(57) ABSTRACT

A method and a system for choosing a transmission mode in a vehicle over the course of a road section, wherein the vehicle has applied coasting prior to this road section and wherein a highest permitted speed $v_{max}$ is defined for the road section, below which an actual speed for the vehicle should be kept. A simulation of a future speed profile $v_{sim\_Gear}$ for a possible gear position for a gearbox in the vehicle is conducted on the basis of a road slope obtained from map data in combination with vehicle positioning information and wherein the simulation simulates, when the road section lies ahead of the vehicle, an actual speed for the vehicle over the course of the road section. Next, an evaluation is carried out of whether a suspension of the coasting in favor of the possible gear position is recommended, wherein the possible gear position is deemed recommendable if a highest value $v_{sim\_Gear\_max}$ for the future speed (Continued)

profile exceeds the highest permitted speed $v_{max}$. The evaluation is then utilized in the choice of transmission mode.

26 Claims, 5 Drawing Sheets

(51) Int. Cl.
  *F16H 59/66*   (2006.01)
  *B60W 50/00*   (2006.01)
  *F16H 59/18*   (2006.01)
  *F16H 59/36*   (2006.01)
  *F16H 59/44*   (2006.01)
  *F16H 59/68*   (2006.01)
  *F16H 59/70*   (2006.01)
  *F16H 63/42*   (2006.01)
  *B60W 10/11*   (2012.01)
  *F16H 59/14*   (2006.01)

(52) U.S. Cl.
  CPC ............. *F16H 59/18* (2013.01); *F16H 59/36* (2013.01); *F16H 59/44* (2013.01); *F16H 59/66* (2013.01); *F16H 59/68* (2013.01); *F16H 59/70* (2013.01); *F16H 63/42* (2013.01); *B60W 10/11* (2013.01); *B60W 2030/1809* (2013.01); *B60W 2030/18081* (2013.01); *B60W 2300/125* (2013.01); *B60W 2550/142* (2013.01); *B60W 2550/143* (2013.01); *B60W 2550/402* (2013.01); *F16H 2059/142* (2013.01); *F16H 2059/186* (2013.01); *F16H 2059/366* (2013.01); *F16H 2059/663* (2013.01); *F16H 2059/666* (2013.01); *F16H 2059/6815* (2013.01); *F16H 2061/0216* (2013.01); *F16H 2063/426* (2013.01); *F16H 2300/02* (2013.01); *Y02T 10/84* (2013.01)

TRANSMISSION CONTROL SYSTEM

CROSS-REFERENCE TO RELATED APPLICATIONS

The present application is a 35 U.S.C. §§371 national phase conversion of PCT/SE2013/050768, filed Jun. 26, 2013, which claims priority of Swedish Application No. 1200389-3, filed Jun. 27, 2012. The contents of both applications are incorporated by reference herein. The PCT International Application was published in the English language.

TECHNICAL FIELD

The present invention relates to a method for choosing a transmission mode and to a system for choosing a transmission mode.

The present invention also relates to a computer program and a computer program product which implement the method according to the invention.

BACKGROUND

For motor vehicles, such as, for example, cars, trucks and buses, a fuel cost represents a significant expense for the owner or user of the vehicle. For a haulage company, for example, apart from the cost of procurement of the vehicle, the main items of expenditure for the running of a vehicle are constituted by pay to the driver of the vehicle, costs of repairs and maintenance, and fuel for propulsion of the vehicle. The fuel cost can here have a very large impact on profitability for the haulage company. Hence a number of different systems have been developed in order to reduce fuel consumption, such as, for example, fuel-efficient engines and fuel-saving cruise control devices.

FIG. 1 shows in schematic representation a drive train in a vehicle 100. The drive train comprises an internal combustion engine 101, which is connected in a conventional manner, via an output shaft 102 from the internal combustion engine 101, usually via a flywheel, to an input shaft 109 of a gearbox 103 by means of a clutch 106. The clutch 106 can be constituted, for example, by an automatically controlled clutch, and is controlled by the control system of the vehicle via a control unit 700 (FIG. 7). The control unit 700 can also control the gearbox 103.

The gearbox 103 is here illustrated schematically as a unit. The gearbox 103 can also, however, physically consist of a plurality of interacting gearboxes, for example of a range gearbox, a main gearbox and a split gearbox, which are arranged along the drive train of the vehicle. The gearbox can comprise a suitable number of gear positions. In contemporary gearboxes for heavy duty vehicles, twelve forward gears, two reverse gears and a neutral gear position are usually found. If the gearbox 103 physically consists of a plurality of part gearboxes according to the above, these twelve forward gears are distributed amongst two gears in the range gearbox, three gears in the main gearbox and two gears in the split gearbox, which together constitute twelve gear positions (2×3×2=12). The vehicle 100 further comprises drive shafts 104, 105, which are connected to the drive wheels 110, 111 of the vehicle and which are driven by an output shaft 107 from the gearbox 103 via an axle gearing 108, such as, for example, a conventional differential.

The vehicle 100 further comprises a variety of different braking systems, such as a conventional service braking system, which can comprise, for example, brake disks with associated brake linings (not shown) arranged next to each wheel. The engine 101 can be controlled on the basis of instructions from a cruise control, in order to maintain a constant actual vehicle speed and/or vary the actual vehicle speed so that a fuel consumption which is optimized within reasonable speed limits is obtained. The engine 101 can also be controlled by a driver of the vehicle.

BRIEF DESCRIPTION OF THE INVENTION

In descents, for example, or in situations in which the vehicle must reduce its actual speed, fuel savings have historically been made by a reduced request for positive engine torque, alternatively with the aid of dragging. The reduced request for positive engine torque means that the driving force in the direction of travel, which the internal combustion engine delivers via the drive wheels, is reduced, for example by reduced fuel injection in the engine 101, thereby reducing the fuel consumption.

Dragging means driving the vehicle with closed drive train, that is to say with the combustion engine 101 connected to the drive wheels 110, 111 of the vehicle, at the same time as the fuel supply to the internal combustion engine 101 is shut off. One advantage with this type of measure is that, since fuel supply to the internal combustion engine is shut off, the consumption of the internal combustion engine is also equal to zero. The measure also means, however, that the internal combustion engine 101 will be driven by the drive wheels of the vehicle via the drive train, so that so called "dragging" is achieved, wherein the internal losses of the internal combustion engine give rise to a braking action, that is to say that the vehicle is engine-braked.

Although a reduction in requested engine torque and dragging lowers the fuel consumption, this lowering is not always optimized, firstly since the reduced engine torque, despite everything, generally consumes more fuel than is necessary and secondly since the dragging, moreover, provides an engine braking of the vehicle which is not economical on fuel.

One way of further lowering the fuel consumption is to coast the vehicle by, as described below, either utilizing a neutral gear position in the gearbox 103 or opening the clutch.

Through the use of coasting, a still lower fuel consumption than with dragging is achieved, since engine braking is eliminated, at the same time as the engine speed is reduced to a minimum.

Coasting can be realized with the engine 101 running or shut off. If the engine 101 is running, coasting is only profitable in a conventional vehicle if the vehicle is not braked or will not need to be braked, which in previously known solutions has led to less than optimal profitability for coasting.

One object of the present invention is to improve the profitability when coasting is applied and thus to improve the driving of the vehicle overall.

This object is achieved by the above-stated method or system. The object is also achieved by the above-stated computer program and computer program product.

Through the use of the present invention, the object, that is to say of improving the profitability when coasting is applied, is achieved.

Where the invention is utilized, coasting is suspended as soon as it has been established that coasting is and/or will be unprofitable. According to the invention, the establishment of whether coasting is and/or will be unprofitable is made more exactly than with previously known solutions. Coasting can therefore be controlled to be utilized only when it is actually profitable, wherein the occurrence of coasting in situations in which it is not profitable decreases, for example when the vehicle will be braked, which is intuitively correctly sensed by a driver of the vehicle. When the appreciation of the driver for the coasting function increases, the degree of use of the coasting function will also increase, which, all in all, reduces the fuel consumption in the vehicle. In other words, the fuel consumption is lowered by the control of the coasting being made more correctly. This more correct control can also result in an increased use of the control system by the driver, which further reduces the fuel consumption.

Through the use of the present invention, a very exact and well informed choice of whether coasting shall continue to be applied or whether a gear position shall be utilized over the course of a road section ahead of the vehicle is obtained. The object of this choice of coasting or gear position is to reduce the engine speed as much as possible and thus save fuel. Since coasting, as has been stated above, is only profitable when the vehicle will not need to be braked, it is important to be able to predict/foresee exactly whether the vehicle will be braked or not over the course of the road section ahead of the vehicle.

According to the present invention, a simulation of a future speed profile $v_{sim\_Gear}$ for an actual speed for the vehicle with respect to a possible gear position is conducted, which results in the system having very good control over how the vehicle will perform over the course of the road section ahead of the vehicle. The future speed profile $v_{sim\_Gear}$ for the actual speed is based on a road slope, which is obtained from map data in combination with positioning information or from a road slope encountered by the vehicle when the simulation is conducted. A very exact prediction can hence be made of whether the driving situation is such that it will lead to a deceleration. This exact prediction enables a correct decision to be taken by the system on whether to continue or suspend coasting.

The invention is especially suitable for the higher gears in the gearbox and, according to one embodiment, the possible gear position constitutes a highest possible gear position for the gearbox, wherein the simulation of the future speed profile $v_{sim\_Gear}$ constitutes a simulation based on this highest possible gear position.

The present invention can be implemented without much adding much to the complexity of the vehicle, at least partially since the invention can make use of data which are already available in other systems in the vehicle, such as road slope information to which cruise controls in the vehicle have access.

The present invention can be utilized both in pedal driving, that is to say that the driver himself regulates the requesting of torque from the engine, and in cruise control driving. The term pedal driving here and in this document comprises essentially all types of control mechanisms which are suited to regulating the torque demand, such as, for example, a gas pedal or a manual throttle device.

BRIEF DESCRIPTION OF FIGURES

The invention will be illustrated in greater detail below on the basis of the appended drawings, in which identical reference symbols are used for identical parts, and wherein.

DESCRIPTION OF PREFERRED EMBODIMENTS

Figure 1:
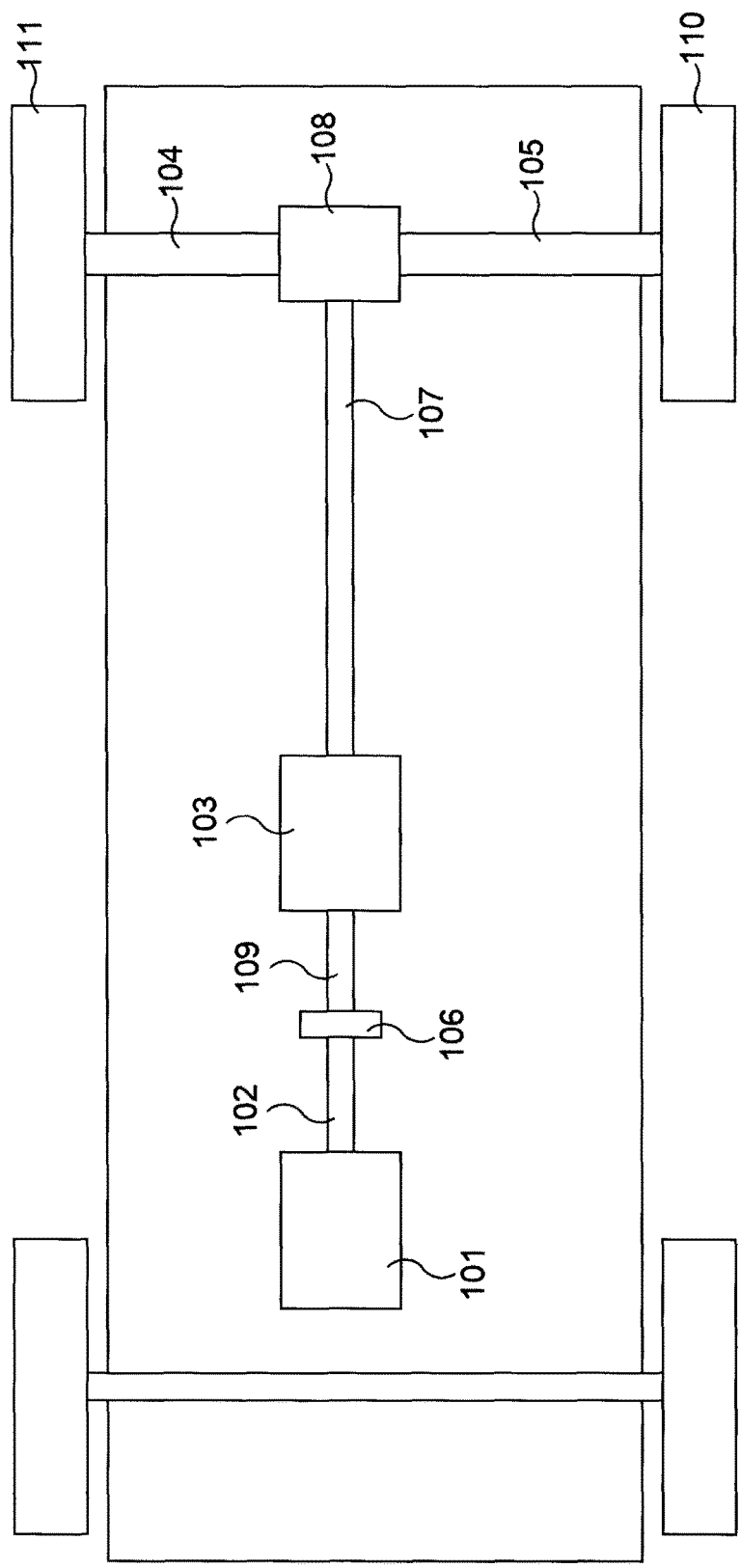
FIG. 1 shows in schematic representation parts of an exemplary vehicle.
Figure 2:
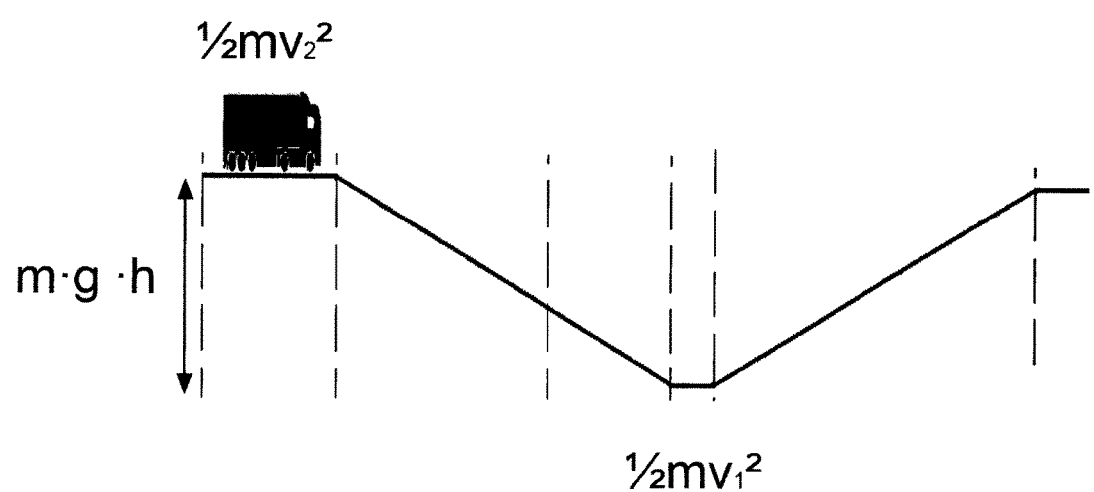
FIG. 2 shows in schematic representation a driving situation.

FIG. 2 shows in schematic representation an example of a driving situation, a descent followed by an ascent, in which the present invention can be applied. The invention can also be applied in other driving situations, for example in the event of an increase in speed, which can occur on a flat road. For pedagogical reasons, however, the driving situation in FIG. 2 will here be used to describe principles for coasting.

For the vehicle in FIG. 2, an energy relationship can be established for the driving situation:

$$mgh = (\tfrac{1}{2}mv_2^2 - \tfrac{1}{2}mv_1^2) + (F_{air} + F_{rr} + F_{eng} + F_{gb} + F_{axle/nav}) \cdot s \quad \text{(equation 1)}$$

in which:

mgh is the potential energy of the vehicle;
$\tfrac{1}{2}mv_2^2$ is the kinetic energy of the vehicle up on the top of the hill;
$\tfrac{1}{2}mv_1^2$ is the kinetic energy of the vehicle at the bottom of the hill;
$F_{air}$ is the air resistance of the vehicle;
$F_{rr}$ is the rolling resistance of the vehicle;
$F_{eng}$ is the engine friction;
$F_{gb}$ is the gearbox friction;
$F_{axle/nav}$ is friction in rear axle, seals and wheel bearings; and
s is the traveled distance between the top and the bottom of the hill.

As can be seen from equation 1, a number of forces $F_{air}$, $F_{rr}$, $F_{eng}$, $F_{gb}$, and $F_{axle/nav}$ act against the motion of the vehicle.

Figure 3:
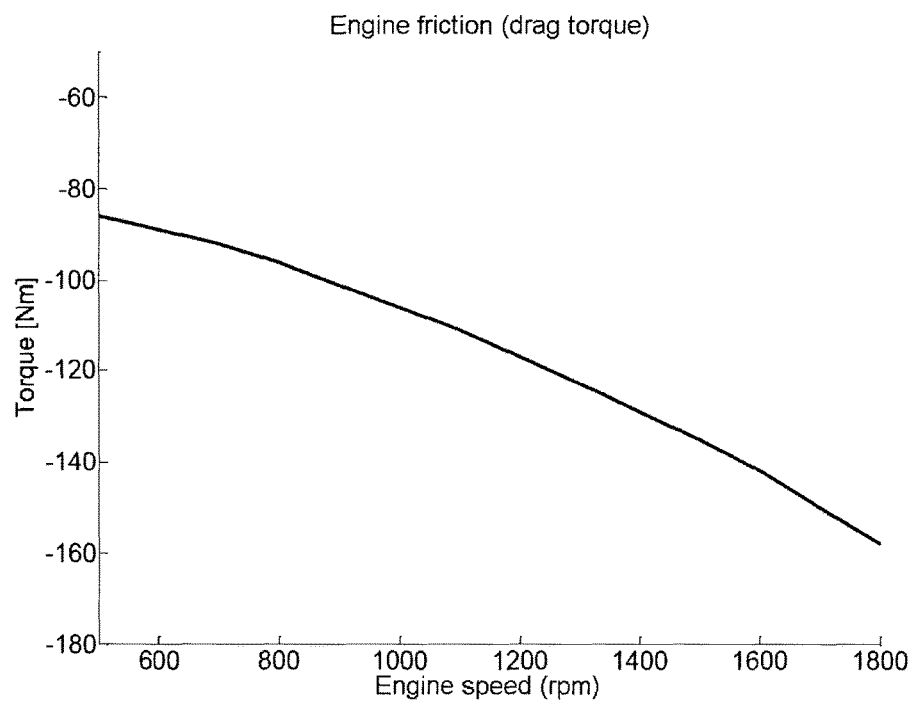
FIG. 3 shows a graph representing engine friction as a function of engine speed.

FIG. 3 shows an example of engine friction for a truck engine. It can here be seen that the negative torque corresponding to the engine friction $F_{eng}$, which inhibits the motion of the vehicle, increases with increased rotation speed for the engine 101 (note that the y-axis has negative gradation in FIG. 3). Conversely, reduced rotation speed for the engine gives reduced force for the engine friction $F_{eng}$, that is to say reduced negative torque, which is exploited by the present invention.

Coasting means in this document that the engine 101 of the vehicle is disengaged from the drive wheels 110, 111 of the vehicle, i.e. that the drive train is opened. This disengagement of the drive wheels 110, 111 from the engine 101, also referred to as opening of the drive train, can be achieved, for example, by setting the gearbox 103 in a neutral position or by opening the clutch 106. In other words, essentially no force is transmitted from the engine 101 to the drive wheels 110, 110 during the coasting. Disengagement of the engine 101 from the drive wheels 110, 111 of the vehicle 100 when the vehicle 100 is in motion is thus referred to in this document as coasting.

Coasting brings about a considerable reduction in the forces acting against the motion of the vehicle, since the force for the engine friction F then diminishes to a value essentially equal to zero (0). Hence coasting can considerably lower the fuel consumption by virtue of this reduced resistance against the vehicle. In certain cases of coasting, idling fuel would have to be supplied to the engine, however, to prevent the engine from stalling, while in other cases the engine can be allowed to stall.

The result is that, from a fuel aspect, it is often more advantageous to drive the vehicle with open drive train, that is to say in coasting mode, than with dragging, that is to say when the drive train is closed at the same time as the fuel supply to the engine 101 is shut off. The reason for this is that the limited quantity of fuel which is required to keep the internal combustion engine running when the internal combustion engine is disengaged is counterbalanced by the fact that the vehicle can continue with disengaged internal combustion engine for a longer distance, for example after a downslope has been negotiated. This is due, inter alia, to the fact that the vehicle will reach a higher speed on, for example, the downslope when driven with disengaged internal combustion engine compared with when the vehicle is driven with closed drive train without fuel supply.

In coasting, moreover, the force which inhibits the driving of the vehicle will be lower when the internal combustion engine of the vehicle is disengaged from the drive shaft, since there is no engine brake force inhibiting the progress of the vehicle. This makes the vehicle decelerate more slowly, for example, when the vehicle reaches the end of the downslope, which in turn means that coasting can often be utilized for a relatively long distance after, for example, an end of a descent. A considerable reduction in fuel consumption is hereby obtained.

According to the present invention, it is determined when, that is to say at what moment, a coasting shall be suspended by the utilization of a possible gear position and what effect this suspension of the coasting would have on the actual speed profile of the vehicle for a road section.

In order to be able to decide this, a future speed profile $v_{sim\_Gear}$ for the actual speed of the vehicle for a road section ahead of the vehicle is simulated on the basis of a possible gear position for a gearbox in the vehicle.

Thus the simulation is conducted such that it is founded on the current position and situation of the vehicle and looks forward over the road section, wherein the simulation is made on the basis of a road slope for the road section and a possible gear position for the gearbox. The road slope for the road section is obtained from map data in combination with positioning information or from a road slope encountered by the vehicle in the simulation instance.

For example, the simulation can be conducted in the vehicle at a predetermined frequency, such as for example at the frequency of 1 Hz, which means that a new simulation result is ready every second. The road section for which the simulation is conducted comprises a predetermined section ahead of the vehicle, in which this, for example, can be 1-4 km long. The road section can also be seen as a horizon ahead of the vehicle, for which the simulation is to be conducted.

Apart from the above-stated parameters of road slope and a possible gear position for the gearbox, the simulation can also be based on one or more of a driving method, a current actual vehicle speed, at least one engine characteristic, such as maximum and/or minimum engine torque, a vehicle weight, an air resistance, a rolling resistance, a gear ratio in the gearbox and/or the drive train, a wheel radius.

The road slope on which the simulations are based can be obtained in a number of different ways. The road slope can be determined on the basis of map data, for example from digital maps comprising topographical information, in combination with positioning information, such as, for example GPS information (Global Positioning System). With the aid of the positioning information, the position of the vehicle in relation to the map data can be established, so that the road slope can be extracted from the map data.

In many present day cruise control systems, map data and positioning information are utilized in the cruise control. Such systems can then provide map data and positioning information to the system for the present invention, the effect of which is that the added complexity for the determination of the road slope is minimized.

The road slope on which the simulations are based can be obtained by estimating the road slope encountered by the vehicle in the simulation instance. There are many ways of estimating this road slope, for example, based: on an engine torque in the vehicle, on an acceleration for the vehicle, on an accelerometer, on GPS information, on radar information, on camera information, on information from another vehicle, on road slope information and positioning information stored earlier in the vehicle, or on information obtained from a traffic system related to the road section. In systems in which information exchange between vehicles is utilized, road slope estimated by one vehicle can also be made available to other vehicles, either directly, or via an intermediate unit such as a database or the like.

The simulations are conducted on the basis of an assumption of utilization of a possible gear position for the gearbox. For the possible gear position, such as for each gear in the gearbox 103, there are parameters related to this gear, such as gear ratio, efficiency and maximally permitted torque, as well as parameters related to the drag torque of the engine as a function of revolution speed. One or more of these parameters can constitute input data for simulation of the future speed profile $v_{sim\_Gear}$ for the possible gear position.

According to the present invention, the simulated future speed profile $v_{sim\_Gear}$ for a possible gear position for the gearbox in the vehicle is compared with a highest permitted speed $v_{max}$, which an actual speed for the vehicle should not exceed over the course of the road section. The comparison is illustrated schematically in FIG. 4. Coasting has here been applied for the vehicle prior to the road section, that is to say before the first moment $T_1$.

An evaluation of whether a suspension of this coasting in favor of a possible gear position is recommended is then conducted on the basis of the comparison with the highest permitted speed $v_{max}$. Suspension of the coasting is recommended, that is to say that the possible gear position is deemed recommendable, if a highest value $v_{sim\_Gear\_max}$ for the simulated future speed profile $v_{sim\_Gear}$ exceeds the highest permitted speed $v_{max}$.

Figure 4:
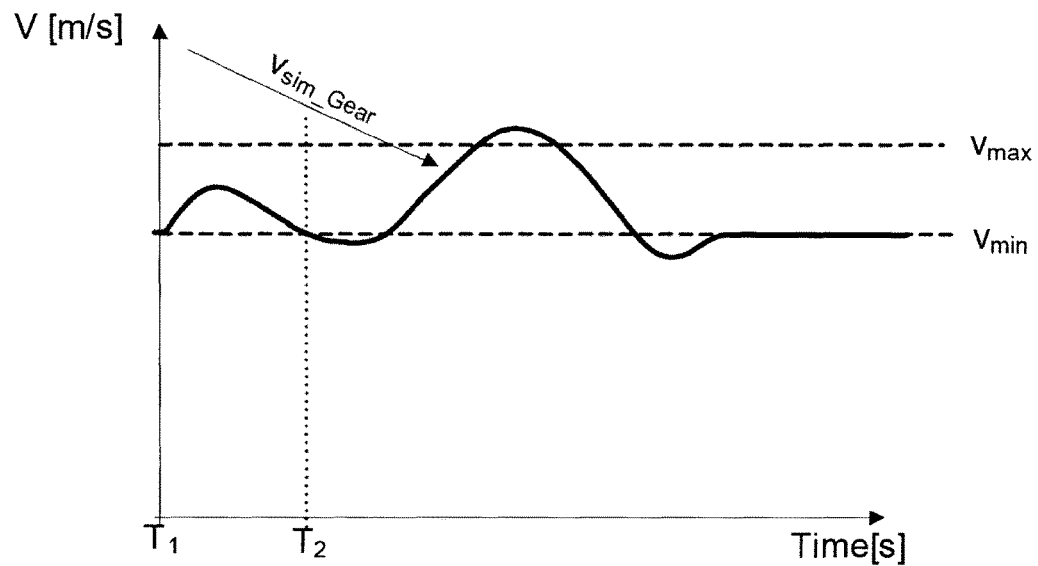
FIG. 4 shows an example of a simulation according to the invention.

In the non-limiting example illustrated in FIG. 4 there is a simulated future speed profile $V_{sim\_Gear}$ for a possible gear position for the gearbox, which has a highest value $v_{sim\_Gear\_max}$ that is greater than the highest permitted speed $v_{max}$. For this example, a suspension of the coasting will thus be recommended, which also means that the possible gear position will be recommended for use.

If the simulated future speed profile $v_{sim\_Gear}$ for a possible gear position for the gearbox for this example had instead been less than the highest permitted speed $v_{max}$ throughout the road section, continued coasting would have been recommended.

Figure 5:
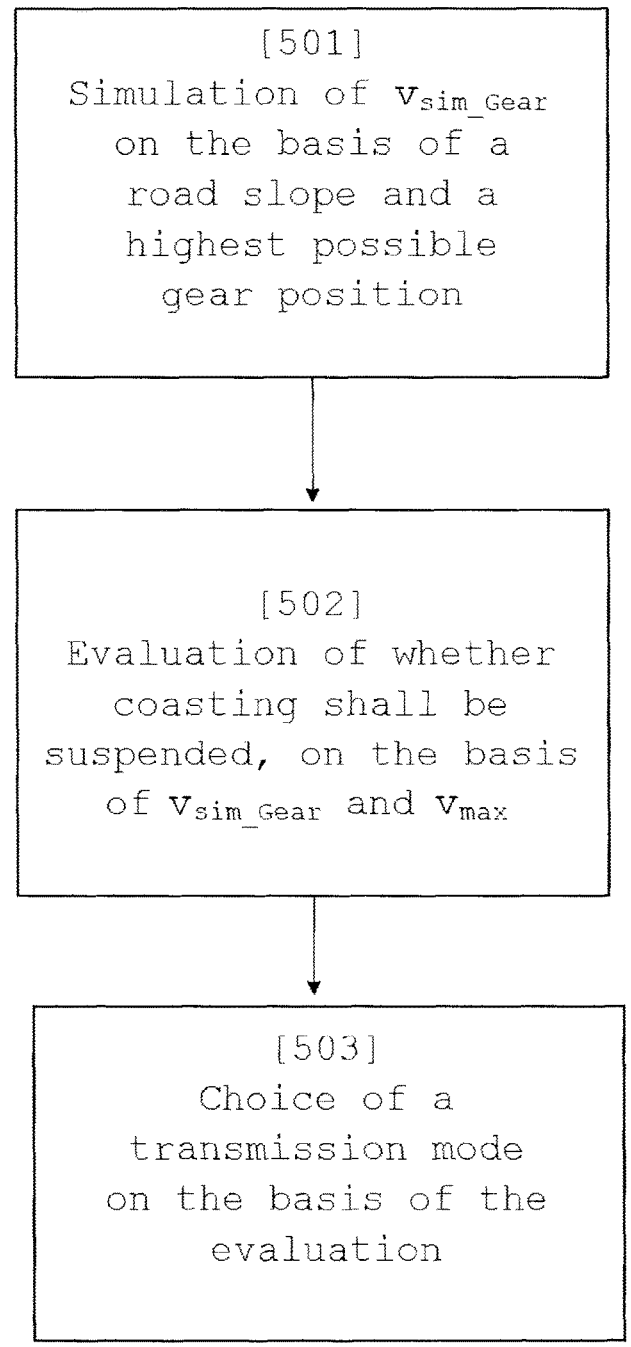
FIG. 5 shows a flowchart for a method according to the invention.

FIG. 5 shows a flowchart for the method according to the present invention. In a first step 501 of the method, a simulation of a future speed profile $v_{sim\_Gear}$ for the road section ahead of the vehicle 100 is conducted, in which the simulation of the future speed profile $v_{sim\_Gear}$ is based on a possible gear position for the gearbox 103 and on a road slope. The simulation is conducted at the first moment $T_1$, when the road section lies ahead of the vehicle 100, and computes an actual speed $v_{act}$ for the vehicle over the course of the coming road section on the basis of the road slope, which is obtained from map data in combination with positioning information or from a road slope encountered by the vehicle at the first moment $T_1$.

According to one embodiment, account is also taken in the simulations of an adopted driving method, in which this driving method can comprise one or more of cruise control driving, driving with drag torque, driving according to an arbitrary torque profile, and gas pedal driving. The simulation can also take account of one or more vehicle parameters, such as, for example, the weight of the vehicle.

In a second step 502 of the method, it is evaluated whether a suspension of coasting is recommended. A suspension of coasting is recommended if a highest value $v_{sim\_Gear\_max}$ for the simulated future speed profile $v_{sim\_Gear}$ exceeds the highest permitted speed $v_{max}$. In other words, the possible gear position for the gearbox 103 is recommended if the highest permitted speed $v_{max}$ is exceeded by the simulated future speed profile $v_{sim\_Gear}$. This can also be expressed as that the coasting should be suspended, since the coasting is no longer applicable. If the highest permitted speed $v_{max}$ is here exceeded by the simulated future speed profile $v_{sim\_Gear}$, the system knows that the highest permitted speed $v_{max}$ will be exceeded even if the vehicle engine-brakes with a gear engaged, which is a clear indication that the coasting should be suspended. Hence a suspension of the coasting is in this case recommended.

In a third step 503 of the method, a transmission mode is next chosen on the basis of the evaluation in the second method step 502. Typically, a transmission mode which has been deemed recommendable in the second method step 502 is here chosen. Thus the possible gear position will be chosen as the transmission mode if it has been deemed recommendable in the evaluation. If the possible gear position has not been deemed recommendable, the coasting can continue. The choice of the transmission mode to be utilized in the vehicle is made, according to one embodiment, by the control system itself. According to another embodiment, the control system, with the aid of a display unit, presents to the driver the suitable transmission mode, whereafter the driver has an opportunity to choose whether the presented transmission mode shall be utilized or not.

In this document, the term transmission mode comprises coasting as well as gear positions in the gearbox, coasting constitutes an imaginary/fictitious highest gear position, and the choice of a lower transmission mode constitutes a suspension of this coasting. In other words, a downshift is here made from an imaginary/fictitious highest gear position to a physical gear position, in which the physical gear position, for example, can constitute any one of the higher gears in the gearbox 103.

By, according to the present invention, basing the choice of transmission mode to be utilized in the vehicle 100 on a simulation of a future speed profile $V_{sim\_Gear}$ for a possible gear position, a factually informed choice of transmission mode can be made. Through the use of the invention, the likelihood of a correct suspension of coasting also increases, since the simulations are made over a longer time period. Previously known solutions have been based on the situation at the precise point when decisions have been taken, which has often led to coasting either having been suspended erroneously, or else having been suspended later than would have been optimal from a fuel perspective. The present invention can therefore provide greater fuel savings than previously known solutions.

The choice of transmission mode according to the present invention can be utilized in the manual requesting of torque from the engine 101, that is to say in pedal driving, or in cruise control driving.

A possible gear position can in this document constitute essentially any gear whatsoever in the gearbox 103, where this gear is usable at the actual speed of the vehicle and/or at an engine torque requested for the driving situation. Thus a simulation of a future speed profile $v_{sim\_Gear}$ is here conducted for at least one gear in the gearbox 103.

However, the invention is especially applicable for the higher gears in the gearbox 103, and especially its highest gear, for example a twelfth gear if the gearbox 103 has a total of twelve gears for the forward drive of the vehicle 100.

According to one embodiment of the present invention, the possible gear position thus constitutes this highest possible gear position. The simulation of the future speed profile $v_{sim\_Gear}$ here constitutes a simulation based on this highest possible gear position.

The possible gear position typically depends on one or more of the following parameters: a rotation speed for the engine 101, a gear ratio for the gearbox 103, a characteristic for the engine 101.

According to one embodiment, the possible gear position can be determined on the basis at least of an actual speed $v_{act}$ for the vehicle at the first moment $T_1$, when the simulation is conducted.

According to another embodiment, the possible gear position is determined on the basis at least of the simulated future speed profile $v_{sim\_Gear}$, which predicts how an actual speed $v_{act}$ for the vehicle varies over the course of the road section.

According to one embodiment of the present invention, the time window during which the evaluation of whether the simulated future speed profile $v_{sim\_Gear}$ exceeds the highest permitted speed $v_{max}$ is limited to the first time period $T_{12}$. The first time period $T_{12}$ extends from a first moment $T_1$, which for the algorithm often constitutes a current moment and at which the simulation is conducted, to a second, later moment $T_2$. In the evaluation according to this embodiment, the possible gear position is deemed recommendable if its highest value $v_{sim\_Gear\_max}$ exceeds the highest permitted speed $v_{max}$ during this first time period $T_{12}$. For the non-limiting example in FIG. 4, the coasting would therefore not have been suspended, since the simulated future speed profile $v_{sim\_Gear}$ is lower than the highest permitted speed $v_{max}$ during the first time period $T_{12}$, so that the possible gear position is not deemed recommendable.

The second moment $T_2$, and thus the end of the first time period $T_{12}$, constitutes according to one embodiment a time when the simulated future speed profile $v_{sim\_Gear}$ falls below a lowest permitted speed $v_{min}$ defined for the road section.

According to one embodiment, the second moment $T_2$ constitutes the last moment in the road section, the first time period $T_{12}$ being as long as the road section, if the simulated future speed profile $v_{sim\_Gear}$ throughout the road section is greater than the lowest permitted speed $v_{min}$ defined for the road section.

According to one embodiment, the magnitude of the lowest permitted speed $v_{min}$, that is to say the level of the lowest permitted speed $v_{min}$, is related to a current actual speed $v_{act}$ for the vehicle. According to one embodiment, the magnitude of the highest permitted speed $v_{max}$ is related to a downhill speed control velocity $v_{dhsc}$ for the vehicle.

According to one embodiment, the magnitude of the lowest permitted speed $v_{min}$ and/or the highest permitted speed $v_{max}$ can be determined at least partially on the basis of information related to a cruise control system in said vehicle, for example on the basis of a set speed $v_{set}$, that is to say a driver-selected speed, for a cruise control system, or on the basis of a reference speed $v_{ref}$ which is utilized by said cruise control system to control a speed regulator. The determination of the lowest permitted speed $v_{min}$ and/or the highest permitted speed $v_{max}$ can also be realized by the cruise control system and made available to the system for the present invention.

According to one embodiment of the present invention, the system according to the present invention is integrated at least partially with cruise control logic of a cruise control system in the vehicle. The lowest permitted speed $v_{min}$ and/or the highest permitted speed $v_{max}$ can then be controlled by the cruise control logic of the vehicle. For example, an intelligent cruise control lowers the vehicle speed in advance of descents, since the vehicle will accelerate during the descent nevertheless. According to this embodiment, the cruise control can also initiate a lowering of the lowest permitted speed $v_{min}$ and thereby prolong the time in coasting mode and/or in the highest possible gear for the vehicle. This lowering of the lowest permitted speed $v_{min}$ can be achieved, for example, if the lowest permitted speed $v_{min}$ is related to the reference speed $v_{ref}$, which is the target value which is lowered by the cruise control in the face of descents, wherein the regulation of the lowest permitted speed $v_{min}$ is obtained automatically. For example, the lowest permitted speed $v_{min}$ can constitute a percentage of the reference speed $v_{ref}$.

The speed limit values which are utilized by the present invention, that is to say the lowest permitted speed $v_{min}$ and/or the highest permitted speed $v_{max}$ can generally be determined on the basis of a number of different methods. For example, these limit values can be fed in by the driver, constitute a percentage of an actual speed $v_{act}$ for the vehicle, constitute a percentage of a set speed $v_{set}$ for a cruise control system in the vehicle and/or be based on historical driving of the vehicle. The historical driving can be taken into account, for example, by utilizing an adaptive algorithm which is updated during the progress of the vehicle. As a non-limiting example it can be cited that the following values could be utilized for the speed limit values in this document:

$v_{min}$=82 km/h or $v_{min}$=0.98×$v_{set}$ km/h;
$v_{max}$=90 km/h or $v_{max}$=1.06×$v_{set}$ km/h, or $v_{max}$=0.995× $v_{dhsc}$ km/h; and
$v_{lim}$=85 km/h or $v_{min}$=1×$v_{set}$ km/h.

As a non-limiting example it can be cited that the first time period $T_{12}$ could have the length $T_{12}$=10 seconds.

The lowest permitted speed $v_{min}$ and/or the highest permitted speed $v_{max}$ can be altered dynamically and can have different values for different transmission modes.

As has been described above, road slope can be determined on the basis of map data and positioning information. If such data are not available, the simulations can be based on estimates of the road slope encountered by the vehicle in the simulation instance. This places greater demands on the magnitude of the lowest permitted speed $v_{min}$ and the highest permitted speed $v_{max}$, since the simulations are less exact and more diverse in magnitude. Moreover, according to one embodiment of the invention, the length of the horizon, that is to say the road section, can be shortened in order to counter these variations.

When the road slope for the road section is approximated with the road slope encountered by the vehicle in the simulation itself, an optimal result will be obtained in the case of a gentle descent. Gentle descents are ideal for coasting if the road slope, for example, is such that the simulated future speed profile $v_{sim\_Gear}$ lies within its permitted range, between the lowest permitted speed $v_{min}$ and the highest permitted speed $v_{max}$.

One advantage of simulating future speed profiles on the basis of current slope is that the same algorithm can be used both for roads and vehicles in which there is no access to future road slope and for roads and vehicles in which there is access to future road slope. Moreover, the simulation makes use of speed-dependent terms, such as, for example, air resistance and engine torque, so that a good estimate of how the vehicle will behave from this point forward is obtained even without knowledge of the future road slope.

Figure 6:
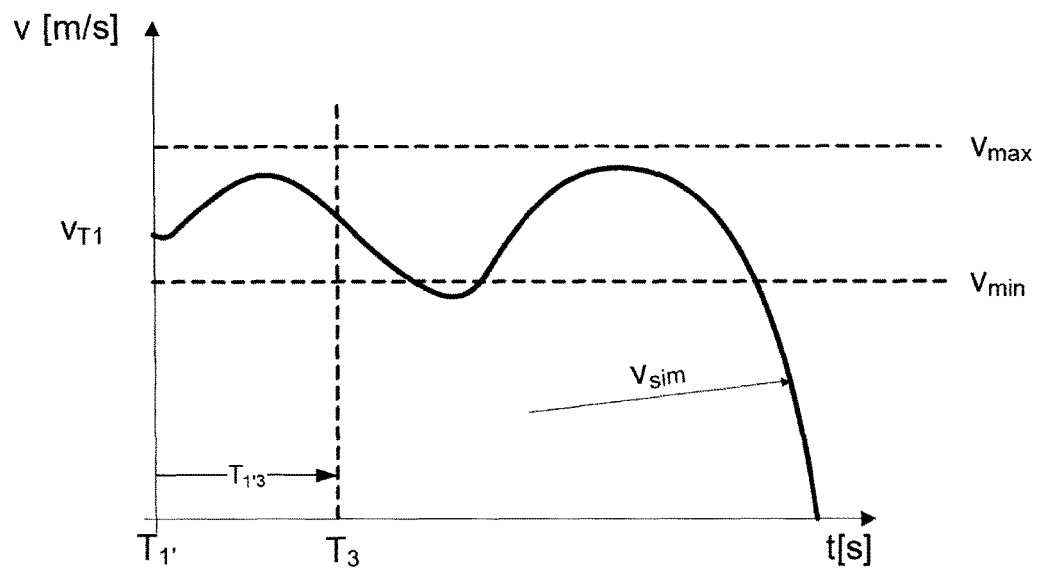
FIG. 6 shows an example of a simulation according to the invention.

According to one embodiment of the invention, the coasting which has been applied by the vehicle prior to the road section, that is to say before the first moment $T_1$, has been chosen by conducting one or more simulations of future speed profiles $v_{sim}$ for the road section ahead of the vehicle 100, in which the simulations for each of the at least one future speed profiles $v_{sim}$ are based on a road slope and on a transmission mode for the vehicle. An example of such a simulation is shown in FIG. 6. Here, one or more simulations for gears in the gearbox 103, for open clutch 106, and/or for neutral gear position in the gearbox 103 can be conducted. According to one embodiment, account is also taken in the simulations of an adopted driving method, in which this driving method can comprise one or more of cruise control driving, driving with drag torque, driving according to an arbitrary torque profile, and gas pedal driving. The simulation can also take account of one or more vehicle parameters, such as, for example, the weight of the vehicle.

Next, the applicability for the transmission modes which are related to the at least one simulated future speed profile $v_{sim}$ is evaluated. A transmission mode is here deemed applicable if its related simulated future speed profile $v_{sim}$ is greater than the above-described lowest permitted speed $v_{min}$ throughout the second time period $T_{13}$, which extends from a further first moment $T_{1'}$ when the simulations are conducted, to the third, later moment $T_3$. The further first moment $T_{1'}$ does not here normally coincide with the above-stated first moment $T_1$.

After this, a transmission mode is chosen for utilization on the basis of the evaluation. Typically, a transmission mode which has been deemed applicable is chosen here. According to one embodiment of the invention, a transmission mode for coasting, if some such has been deemed to be applicable, is chosen here. Otherwise, a transmission mode for the gear position which has been deemed to be applicable is chosen. The choice of the transmission mode to be utilized in the vehicle is made, according to one embodiment, by the control system itself. According to another embodiment, the control system presents the suitable transmission mode to the driver with the aid of a display unit, whereafter the driver has an opportunity to choose whether the presented transmission mode shall be utilized or not. An applicable/appropriate transmission mode is in this document a transmission mode which is usable, while the chosen highest applicable transmission mode constitutes a recommended transmission mode.

According to one embodiment, the third moment $T_3$ is chosen such that the second time period $T_{1:3}$ corresponds to a smallest/shortest permitted time period for which a gear should be utilized in order to avoid inconsistent gearshift. Inconsistent gearshift here comprises shifts between different gears/transmission modes at relatively high frequency. Thus the second time period $T_{1:3}$ has a length which ensures that the driver is not subjected to unnecessarily frequent and irritating gearshift.

The person skilled in the art will appreciate that a method for choosing a transmission mode according to the present invention can also be implemented in a computer program, which, when it is executed in a computer, instructs the computer to execute the method. The computer program is usually constituted by a computer program product 703 stored on a non-transitory digital storage medium, in which the computer program is incorporated in the computer-readable medium of the computer program product. The computer-readable medium consists of a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 7:
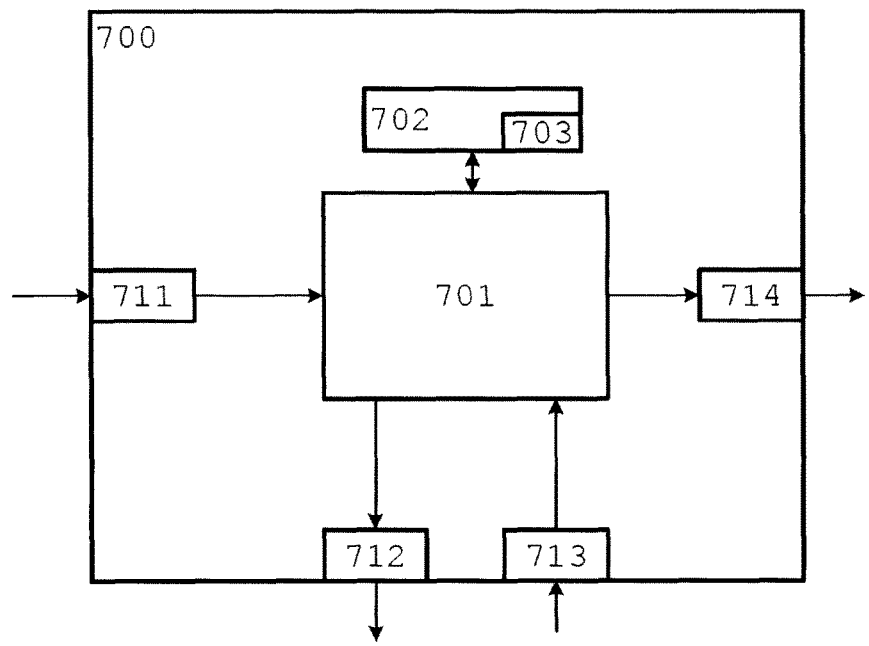
FIG. 7 shows a control unit according to the invention.

FIG. 7 shows in schematic representation a control unit 700. The control unit 700 comprises a computing unit 701, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 701 is connected to a memory unit 702 arranged in the control unit 700, which memory unit provides the computing unit 701 with, for example, the stored program code and/or the stored data which the computing unit 701 requires to be able to perform computations. The computing unit 701 is also arranged to store partial or final results of computations in the memory unit 702.

In addition, the control unit 700 is provided with devices 711, 712, 713, 714 for receiving and transmitting input and output signals. These input and output signals can contain waveforms, impulses, or other attributes which, by the devices 711, 713 for the reception of input signals, can be detected as information and can be converted into signals which can be processed by the computing unit 701. These signals are then made available to the computing unit 701. The devices 712, 714 for the transmission of output signals are arranged to convert signals received from the computing unit 701 in order to create output signals by, for example, modulating the signals, which can be transmitted to other parts of and/or systems in the vehicle.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 701 and that the above-stated memory can be constituted by the memory unit 702.

Control systems in modern vehicles commonly consist of communication bus systems consisting of one or more communication buses for linking a number of electronic control units (ECUs), or controllers, and various components located on the vehicle. Such a control system can comprise a large number of control units and the responsibility for a specific function can be divided amongst more than one control unit. Vehicles of the shown type thus often comprise significantly more control units than are shown in FIG. 7, which is well known to the person skilled in the art within the technical field.

In the shown embodiment, the present invention is implemented in the control unit 700. The invention can also, however, be implemented wholly or partially in one or more other control units already present in the vehicle, or in some control unit dedicated to the present invention.

According to one aspect of the invention, a system for choosing a transmission mode in a vehicle is provided, in which the system comprises a simulation unit, arranged to simulate the future speed profile $v_{sim\_Gear}$ for the possible gear position for the gearbox. This simulation is effected when the road section lies ahead of the vehicle, and on the basis of a road slope, and results in an actual speed for the vehicle over the course of the road section. The road slope is obtained from map data in combination with positioning information or from a road slope encountered by the vehicle in the simulation instance.

The system also comprises an evaluation unit, which is arranged to evaluate whether a suspension of the coasting utilized prior to the road section, in favor of the possible gear position, shall be recommended. The possible gear position is deemed recommendable, that is to say a suspension of coasting is recommended, if a highest value $v_{sim\_Gear\_max}$ for the future speed profile exceeds the highest permitted speed $v_{max}$.

The system also comprises a utilization unit, which is arranged to utilize the evaluation conducted by the evaluation unit in order to choose a transmission mode for the vehicle.

According to one embodiment of the invention, the transmission mode to be used by the vehicle is chosen by the control system.

According to another embodiment of the invention, which is directed toward providing the driver of the vehicle with information to support decision making when driving the vehicle, the utilization unit comprises a display unit. This display unit is arranged to present the possible gear position if a suspension of the coasting is recommended. Here, therefore, the decision as to which transmission mode shall be used by the driver is taken.

The display unit is preferably arranged integrated with, or adjacent to, a user interface in the vehicle, with the result that the display of a suitable transmission mode for use is clearly visible to the driver.

The display of the indicators can have a number of different designs. For example, the display is constituted by one or more indicators for transmission modes, such as signs, numerals, letters, symbols, patterns, figures, colors, animations, and sound.

The system, that is to say the simulation unit, the evaluation unit, the utilization unit, and for certain embodiments the display unit, is designed to be able to realize all the above-described embodiments of the method according to the present invention.

The person skilled in the art will appreciate, of course, that speeds and speed limit values which have been quoted in this document have equivalences and can be translated into revolution speeds and revolution speed limit values or torque and torque limit values. Likewise, the person skilled in the art will appreciate that there is a very well known correlation between distances, times and speeds, so that the herein quoted times and time periods have equivalences in positions and distances.

The person skilled in the art will also appreciate that the system above can be modified according to the different embodiments of the method according to the invention. The invention additionally relates to a motor vehicle 1, for example a truck or a bus, comprising at least one system for choosing a transmission mode according to the invention.

The present invention is not limited to the above-described embodiments of the invention but relates to and comprises all embodiments within the scope of the appended independent claims.

The invention claimed is:

1. A method for choosing a transmission mode in a vehicle over the course of a road section, wherein said vehicle has applied coasting prior to said road section, and wherein a highest permitted speed $v_{max}$ for said vehicle is defined for said road section;
the method comprising:
simulating a future speed profile $v_{sim\_Gear}$ for a possible gear position for a gearbox in said vehicle on the basis of a road slope obtained from map data in combination with positioning information of said vehicle or from a road slope encountered by said vehicle when said simulating is conducted, and wherein said simulating simulates an actual speed for said vehicle over the course of said road section when said road section lies ahead of said vehicle;
evaluating whether a suspension of said coasting in favor of said possible gear position is recommended, wherein said possible gear position is deemed recommendable if a highest value $V_{sim\_Gear\_max}$ for said future speed profile $v_{sim\_Gear}$ exceeds said highest permitted speed $v_{max}$; and
utilizing an evaluation based on said evaluating in choosing said transmission mode.

2. The method as claimed in claim 1, wherein said evaluating deems said possible gear position recommendable if said highest value $V_{sim\_Gear\_max}$ for said future speed profile $v_{sim\_Gear}$ exceeds said highest permitted speed $v_{max}$ during a first time period $T_{12}$, which extends from a first moment $T_1$, when said simulating is conducted, to a second, later moment $T_2$.

3. The method as claimed in claim 2, wherein said second moment $T_2$ constitutes a moment when said future speed profile $v_{sim\_Gear}$ falls below a lowest permitted speed $v_{min}$ defined for said road section.

4. The method as claimed in claim 3, wherein a magnitude for said lowest permitted speed $v_{min}$ is determined at least partially based on information related to a cruise control system in said vehicle.

5. The method as claimed in claim 4, wherein said determining of said magnitude for said lowest permitted speed $v_{min}$ is performed by said cruise control system.

6. The method as claimed in claim 4, wherein said magnitude for said lowest permitted speed $v_{min}$ is related to a reference speed $v_{ref}$ which is utilized by said cruise control system.

7. The method as claimed in claim 4, wherein said magnitude for said lowest permitted speed $v_{min}$ is related to a current actual speed $v_{act}$ for said vehicle.

8. The method as claimed in claim 3, wherein said magnitude for said lowest permitted speed $v_{min}$ is altered dynamically.

9. The method as claimed in claim 2, wherein said second moment $T_2$ constitutes a last moment in said road section if said future speed profile $V_{sim\_Gear}$ throughout said road section exceeds a lowest permitted speed $v_{min}$ defined for said road section.

10. The method as claimed in claim 1, wherein said magnitude for said highest permitted speed $v_{max}$ is related to a downhill speed control velocity $v_{dhsc}$ for said vehicle.

11. The method as claimed in claim 1, wherein said magnitude for said highest permitted speed $v_{max}$ can be altered dynamically over the course of said road section.

12. The method as claimed in claim 1, wherein said possible gear position depends at least on an actual speed for said vehicle at a first moment $T_1$, when said simulating is conducted.

13. The method as claimed in claim 1, wherein said possible gear position depends at least on said future speed profile $v_{sim\_Gear}$.

14. The method as claimed in claim 1, wherein said possible gear position depends on at least one parameter selected from a group consisting of:
a rotation speed for an engine in said vehicle;
a gear ratio for said gearbox; and
a characteristic for said engine in said vehicle.

15. The method as claimed in claim 1, wherein said possible gear position constitutes a highest possible gear position and said future speed profile $v_{sim\_Gear}$ is a simulation based on said highest possible gear position.

16. The method as claimed in claim 1, wherein said choice of said transmission mode is utilized in a manual requesting of torque from an engine in said vehicle.

17. The method as claimed in claim 1, further comprising using said choice of said transmission mode in cruise control driving of said vehicle.

18. The method as claimed in claim 1, wherein said road slope is provided by a cruise control system which utilizes map data and positioning information of said vehicle in said cruise control system.

19. The method as claimed in claim 1, wherein when said road slope corresponds to a road slope encountered by said vehicle at a first moment $T_1$, when said simulation is conducted, said road slope is determined based on at least one information type selected from a group consisting of:
radar based information;
camera based information;
information obtained from a vehicle other than said vehicle;
road slope information and positioning information stored earlier in said vehicle; and
information obtained from a traffic system related to said road section.

20. The method as claimed in claim 1, wherein at least one of a lowest permitted speed $v_{min}$ and said highest permitted speed $v_{max}$ is determined on a basis selected from a group consisting of:
at least one input by a driver of said vehicle;
an actual speed $v_{act}$ of said vehicle;
a set speed $v_{set}$ for a cruise control system in said vehicle; and
an adaptive algorithm, which is adapted to earlier driving of said vehicle.

21. The method as claimed in claim 1, wherein said simulating is based on a driving method comprising at least one driving method selected from a group consisting of:
cruise control driving;
driving with drag torque;
driving according to an arbitrary torque profile; and
manual driving.

22. The method as claimed in claim 1, wherein said choice of said transmission mode is performed by a control unit in said vehicle choosing said possible gear position if said possible gear position has been deemed recommendable.

23. The method as claimed in claim 22, wherein said control unit presents said chosen possible gear position to a driver of said vehicle.

24. A computer program product comprising a computer program comprising program code, stored in a non-transitory computer-readable medium and when said program code is executed in a computer, said program code instructs said computer to execute the method as claimed in claim 1.

25. A system for choosing a transmission mode in a vehicle over the course of a road section, wherein said vehicle has applied coasting prior to said road section, and wherein a highest permitted speed $v_{max}$ for said vehicle is defined for said road section; the system comprising:

a simulation unit configured to simulate a future speed profile $v_{sim\_Gear}$ for a possible gear position for a gearbox in said vehicle on the basis of a road slope obtained from map data in combination with positioning information of said vehicle or from a road slope encountered by said vehicle when said simulation is conducted, and wherein said simulation simulates an actual speed for said vehicle over the course of said road section when said road section lies ahead of said vehicle;

an evaluation unit configured to evaluate whether a suspension of said coasting in favor of said possible gear position is recommended, wherein said possible gear position is deemed recommendable if a highest value $v_{sim\_Gear\_max}$ for said future speed profile $v_{sim\_Gear}$ exceeds said highest permitted speed $v_{max}$; and a utilization unit configured to utilize said evaluation in choosing said transmission mode.

26. The system as claimed in claim 25, wherein said utilization unit comprises a display unit configured and arranged to present to a driver of said vehicle said possible gear position if said possible gear position has been deemed recommendable.

* * * * *